March 25, 1969     A. E. SECKINGER     3,434,887

BATTERY FILL APPARATUS

Filed Dec. 29, 1966

Inventor
Albert E. Seckinger
By Joseph A. Lemignani
Attorney.

United States Patent Office 3,434,887
Patented Mar. 25, 1969

3,434,887
BATTERY FILL APPARATUS
Albert E. Seckinger, Milwaukee, Wis., assignor to Harley-Davidson Motor Co., Milwaukee, Wis.
Filed Dec. 29, 1966, Ser. No. 605,708
Int. Cl. H01m 47/00, 7/00
U.S. Cl. 136—162   19 Claims This invention relates to recharging and refilling an electric battery and, more particularly, to an arrangement for automatically refilling a battery, or batteries, with electrolyte upon connection thereof for recharging.

The teachings of this invention are particularly adapted for use in electrically powered golf carts, and the like, and it will be described herein as incorporated in an electric golf cart. However, it will be appreciated that the invention has a wider, more general application to arrangements powered by batteries which are intended to be periodically recharged. For that reason, the invention is not to be construed as specifically limited to golf carts or to any other specific use.

Generally the batteries of an electric golf cart are recharged after a designated period of use. In addition to recharging it is also essential to proper battery operation that the level of electrolyte in the battery be maintained above a minimum level. In the past, this has generally required periodic inspection and refilling of the batteries.

An object of this invention is to provide an arrangement whereby a battery is automatically refilled, if necessary, when it is connected for recharging.

A further object of this invention is to provide an arrangement wherein battery refill is coordinated with battery charging apparatus.

A still further, more specific object of this invention is to provide a battery refill and recharging arrangement wherein recharging is initiated automatically after the refill operation has been completed.

Other objects and advantages will be pointed out in, or be apparent from, the specification and claims, as will obvious modifications of the embodiment shown in the drawings, in which:

Figure 1:
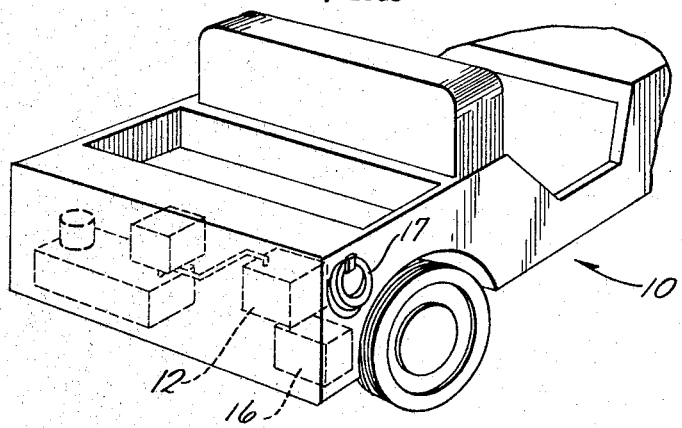
FIG. 1 is a schematic view with a general illustration of a battery and its refill mechanism as incorporated in a golf cart.
Figure 2:
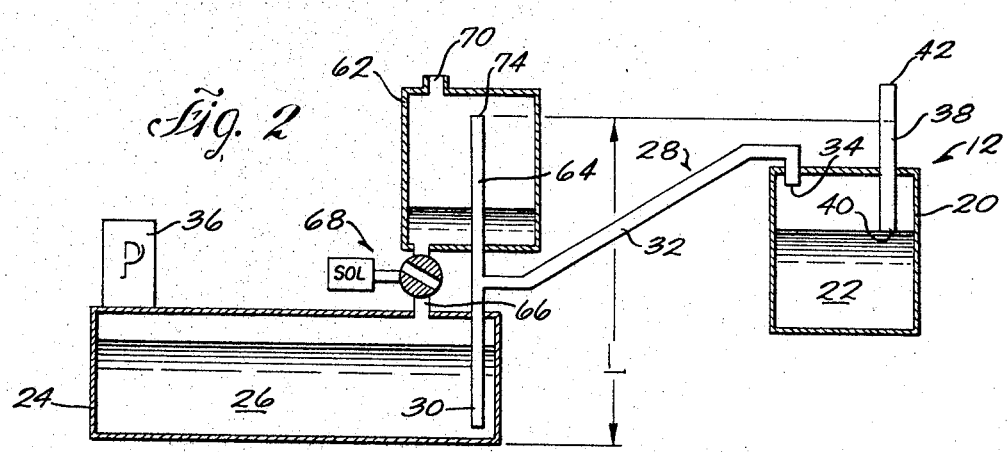
FIG. 2 is an illustration of a refill arrangement for the battery.
Figure 3:
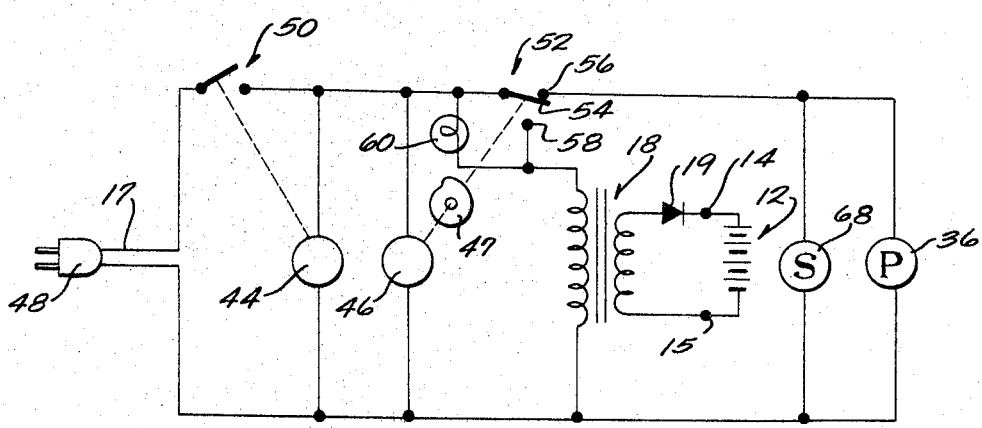
FIG. 3 is a circuit diagram illustrating a portion of the overall circuit and the coordination between the charging and refill portions of that circuit.

With reference to the drawings, golf cart 10 is illustrated as incorporating an automatic battery fill system. A single battery 12 is illustrated in the system. The battery includes conventional external terminals 14 and 15 which are suitably connected to a charging circuit. The charging circuit is part of a unit 16 incorporated in the golf cart and is selectively connected to an external AC source through cord 17. As illustrated in FIG. 3, the charging circuit portion of unit 16 includes transformer 18 and rectifier 19. Since the specific recharging circuit and the connections between it and the battery can take any form well known to those skilled in this particular art, only a general schematic illustration has been made in the drawing and this is believed to be sufficient for the purpose of understanding this invention.

Battery 12 includes container 20 which is partially filled with battery electrolyte 22. The battery also includes the conventional active cell assemblies but for convenience they have not been shown in the drawings. The fill system includes a reservoir 24 containing liquid 26 which functions as the battery electrolyte. Reservoir 24 is connected to battery container 20 through conduit 28. Conduit 28 includes a portion 30 which extends to a point near the bottom of reservoir 24 and also includes a connecting portion 32 which extends from portion 30 to container 20. Portion 32 extends through battery container 20 to the interior thereof and terminates in a nozzle 34. Nozzle 34 is preferably spaced above the level of electrolyte in container 20.

Flow of liquid from the reservoir to the battery occurs through conduit 28 and any suitable arrangement can be utilized to influence such flow. Preferably, an air pump 36, of conventional construction, is connected to reservoir 24 and communicates with the interior of the reservoir. As will be described more completely hereinafter, except for the various flow passages opening into reservoir 24, the reservoir is sealed so that operation of pump 36 pressurizes the reservoir to create the force necessary to produce liquid flow to battery 12.

Battery 12 also includes a stand pipe 38 which extends through the battery container. More specifically, one end 40 of the stand pipe opens into the interior of the container and the opposite end 42 is open to the atmosphere ambient the container. The point at which end 40 is positioned with respect to electrolyte 22 in the battery is preselected in accordance with the level of electrolyte which is to be maintained in the battery. Should the electrolyte fall below that predetermined level and expose the lower end of stand pipe 38, energization of pump 36 will cause liquid flow through conduit 28 into the battery container. Stand pipe 38 provides an escape passage for air as liquid is admitted into the battery. As flow continues, the electrolyte rises in container 20 until it reaches end 40 of the stand pipe. At this time the stand pipe is no longer capable of exhausting air from the battery container so that continued delivery of liquid to the battery results in an increase in pressure within the container and above the electrolyte. Eventually the pressure within the battery container equals that causing flow of liquid to the container. A condition of equilibrium is reached and liquid is no longer able to flow from nozzle 34. This turns off the flow to the battery and establishes the desired predetermined level of electrolyte. During the period between the time that stand pipe end 40 is closed and the equilibrium condition occurs, electrolyte delivered to the battery is accommodated by rising in stand pipe 38.

With reference to FIG. 3, pump 36 is connected in circuit with the battery charger. More particularly, in addition to pump 36 and the transformer 18 the overall circuit includes timers 44 and 46. For operation, the circuit is connected to a conventional 110-volt AC source by means of plug 48 and normally open switch 50 is closed. This completes the circuit to timers 44 and 46 and, through switch 52, to pump 36. Timer 44 controls switch 50 to determine the charging cycle. At the end of a preselected time interval determined by the normal charging time for a battery or batteries, for example 12 hours, timer 44 operates switch 50 to its open position to interrupt the circuit and terminate the charging cycle. Within the first time interval determined by timer 44, timer 46 controls the duration of energization of pump 36 and establishes a second time interval which is considerably shorter than the first interval, for example two-three minutes. Switch 52 is a double-throw switch and at the end of the second time interval timer 46 switches movable blade 54 of switch 52 from contact 56 to contact 58 thereby interrupting the circuit to pump 36 and completing a circuit for energization of transformer 18. Although the refill and charge cycles could be initiated simultaneously, experience has shown that prferably the charging cycle should follow the refill cycle. The battery has a tendency to gas during charging and this gassing may interfere with the refill operation. Thus to insure a proper refill the combined refill-charge arrangement simultaneously sets up a circuit for charging and initiates the refill operation and, at the termination of the refill cycle, automatically completes the charging circuit.

It will be noted that an indicator lamp 60 is contained in circuit with switch 52 and transformer 18. With the illustrated arrangement, lamp 60 is energized during the battery fill cycle determined by timer 46 to give a visual indication that the battery is being filled. Lamp 60 can be located on the control panel of the cart. The lamp circuit is completed through the transformer primary and in that manner a relatively simplified circuit is maintained. Preferably a neon lamp is used as the indicator so that the inherent high resistance of the lamp limits current flow in the transformer primary, during the refill cycle, to an amount below that necessary to produce charging. When timer 46 operates switch 52 to contact 58 at the termination of the fill cycle, the charging circuit is completed by making the transformer circuit around the lamp. This also extinguishes the lamp giving a visual indication that the fill cycle haas been completed and the charging cycle has started.

The duration of the fill cycle can of course be adjusted through timer 46 to select the particular time interval necessary to insure complete refilling of the battery during each cycle. Experience in a given application will determine what the duration of the refill cycle should be to insure the necessary fill time. That is, the normal expected drop in electrolyte level over a given period of time can be observed and the timer adjusted to provide sufficient time to replenish that normal drop. However, with the automatic termination of the fill cycle which occurs when the above discussed equilibrium condition is reached, electrolyte flow is automatically shut off if refill is completed before the termination of the time interval set by timer 46. The timers can take any conventional form and, moreover, the functions of the two timers can be incorporated into a single timer if desired. As shown in FIG. 3, timer 46 drives a cam 47 which controls operation of switch 52 and switch blade 54 can be suitably spring biased toward engagement with contact 58 with cam 47 being operative selectively to move blade 54 into engagement with contact 56 and to release the blade for movement into engagement with contact 58. By proper selection of the profile of cam 47, the period during which blade 54 is held in engagement with contact 56 can be established to arrive at the desired fill time.

In the illustrated embodiment wherein liquid flow is achieved by pressurizing reservoir 24, a holding tank 62 is associated with reservoir 24 and its function will now be explained. The holding tank is positioned above the level of liquid in reservoir 24 and is connected to the reservoir through a conduit 64 which also serves as a reservoir stand pipe. In the preferred embodiment conduit 64 communicates with reservoir 24 through conduit 28, this arrangement being preferred for a reason which will become apparent from the following discussion. In the event that flow to the battery is terminated before pump 36 is de-energized, water rises in conduit 64 as well as in stand pipe 38. A return passage 66, preferably separate from passage 64, is provided between the holding tank and reservoir 24. A solenoid valve 68 is connected in the return passage and is normally open but is closed when the refill cycle is initiated and pump 36 is energized. It will be noted that in FIG. 3 solenoid valve 68 is connected in circuit with pump 36 and is also controlled by switch 52 so that it is closed upon initiation of the refill cycle, and when pump 36 is started, and it is de-energized when the pump is de-energized. At the end of the fill cycle the solenoid valve 58 opens to provide a passage for return flow of liquid from the holding tank into the reservoir.

Holding tank 62 includes a vent 70 which opens to the atmosphere so that the pressure inside the holding tank is lower than the pressure in the reservoir during the pumping cycle. With this arrangement, when solenoid valve 68 is open the reservoir is vented to the atmosphere so that not only does the liquid in the holding tank flow back into the reservoir but the liquid contained in conduit 28 drains into the reservoir. Moreover, by connecting the holding tank to the reservoir through the same conduit which communicates with the battery, battery gases accumulated in battery 12 are vented through conduit 28 and holding tank 62 to the atmosphere. If desired, the overall coordinated operation of refill and charging cycles can be maintained using a positive displacement pump in the conduit to the battery so that the reservoir need not be sealed and the holding tank could be eliminated; with such an arrangement stand pipe 64 could be arranged to overflow directly into reservoir 24.

It will also be noted that the upper extension of conduit 64, end 74 thereof, cooperates in determining the pressure which must be reached in battery 12 before water flow is turned off. The upper extension of conduit 64 places a limit on the pressure which can be established in the reservoir and when the level of electrolyte in stand pipe 38 reaches the level of the open end 74 of the conduit 64 the equilibrium condition is reached and shut-off occurs. This also provides some measure of control over the operation of the fill mechanism and over the level of electrolyte to be maintained in the battery.

Nozzle 34 opens into battery 12 above the normal level of liquid in reservoir 24 so that conduit 28 drains by gravity at the end of the fill cycle and, similarly, holding tank 62 is preferably positioned above the level of liquid in the reservoir so that it too drains to the reservoir by gravity. Thus a relatively simplified arrangement is maintained while insuring proper drainage at the end of a fill cycle.

The operation of the charging system and the automatic refill system will now be summarized. Closure of switch 50 energizes both timers 44 and 46, energizes lamp 60 through transformer 18, and closes solenoid 68 while starting pump 36. Reservoir 24 and battery 12 being sealed except for the points of entry of the various conduits, pump 36 creates a pressure above liquid 26 which causes liquid to flow in conduit 28 to battery 12. If the level of electrolyte in the battery has fallen so as to expose the end of stand pipe 38 liquid flows into the battery container. Liquid continues to flow into the battery until the end 40 of the stand pipe is closed whereupon electrolyte begins to rise in the stand pipe and pressure builds up within the battery. When the electrolyte in stand pipe 38 reaches the level L, which is determined by end 74, the pressures in the battery and in the delivery system from the reservoir are equalized and flow from the nozzle 34 is shut off. Should any interval remain on timer 46, liquid will be pumped through conduit 64 into holding tank 62 with the holding tank accommodating any excess liquid flow. At the end of the interval set by timer 46, switch 52 is operated from contact 56 to contact 58. This initiates the charging cycle and de-energizes pump 36 and opens solenoid valve 68 thereby exposing the reservoir to atmospheric pressure through the holding tank and vent 70. Liquid contained in the holding tank drains back into the reservoir as does liquid contained in conduit 28. The conduit 28 is then cleared and provides a passage for escape of gases which may be trapped above the electrolyte in the battery through the holding tank. The pressure is also relieved in the battery and liquid drains from the stand pipe. The charging cycle continues until timer 44 opens switch 50 thereby interrupting the circuit to transformer 18. In this regard the structure of timer 46 is preferably such that upon termination of the charging cycle switch 52 is automatically returned to its position making a circuit through contact 56 so that the arrangement is ready for another refill and charge operation when power is re-applied to the circuit. Again any conventional timer arrangement could be used to accomplish this function.

Although this arrangement has been discussed with one battery it will be appreciated that the same basic arrangement could be used to charge and/or fill any number of batteries simultaneously and without departing from either the spirit or scope of this invention. Also the fill arrangement could be used alone to continuously monitor and fill a battery or batteries.

Although but one embodiment of the present invention has been illustrated and described, it will be apparent to those skilled in the art that various changes and modifications may be made therein without departing from the spirit of the invention or from the scope of the appended claims.

I claim:

1. Battery charging and filling apparatus comprising, in combination,
   a battery including a liquid container,
   battery charging means connected to said battery,
   means for selectively energizing said battery charging means and including timing means operative to terminate operation of said battery charging means after a first time interval,
   a liquid reservoir,
   means defining a flow passage from said reservoir and into said battery container,
   selectively energizable means operatively associated with said reservoir and the liquid therein and operative when energized to cause flow of liquid from said reservoir to said battery container,
   vent means defining an air exhuast passage extending from the interior of said battery container to a point exteriorly of said container, said vent means opening into the interior of said battery container at a point corresponding to a predetermined level of liquid within said container so that said exhaust passage provides air exhaust from said container so long as said liquid is below said predetermined level,
   said battery container being otherwise substantially sealed except for said vent means and flow passage,
   and said timing means also connected to and controlling said means for causing flow to said battery, said timing means operative to control energization of said timing means and said means for causing flow to said battery.

2. The apparatus of claim 1 wherein said flow passage opens into said container above the liquid level in said container.

3. The apparatus of claim 1 wherein said timing means is operative to energize said means for causing flow to said battery and after a preselected interval de-energides said flow causing means and energizes said charging means.

4. The apparatus of claim 3 wherein said timing means includes first and second timing apparatus,
   said first timing apparatus setting up circuits to said flow causing means and said battery charging means and establishing a first time interval during which said circuits are set up,
   and said second timing means completing a circuit to said flow causing means during an initial portion of said first time interval and subsequently completing the circuit to said battery charging means.

5. The apparatus of claim 4 wherein said second timing means maintains energization of said flow causing means for a second time interval of preselected duration less than that of said first time interval and wherein only said flow causing means is energized during said first time interval and only said battery charging means is energized during said second time interval and after said first time interval.

6. The apparatus of claim 1 wherein said means for causing flow of said liquid comprises pump means operative to pressurize the interior of said reservoir to force said liquid from said reservoir and through said flow passage to said container.

7. The apparatus of claim 6 including liquid holding means connected to said reservoir to receive liquid flow from said reservoir when said liquid in said battery reaches said predetermined level.

8. The apparatus of claim 7 including means for returning said liquid to said reservoir from said liquid holding means after said flow causing means is de-energized.

9. The apparatus of claim 8 wherein said liquid holding means comprises tank means positioned above the level of liquid in said liquid reservoir and including means defining a second passage for flow of liquid from said liquid reservoir to said tank means,
   said liquid return means includes means defining a return flow passage from said tank means to said liquid reservoir and valve means in said return flow passage controlled by said second timing means, said valve means being closed upon energization of said flow causing means and opened after de-energization of said flow causing means,
   said liquid reservoir being substantially sealed except for said flow passage means and said tank means being at a pressure lower than the pressure in said reservoir during said second time interval.

10. The apparatus of claim 9 wherein said flow passage into said battery container opens into said container above the level of liquid in said reservoir.

11. The apparatus of claim 10 wherein said second flow passage includes a portion extending generally vertically in said tank means and opening into said tank means above the lowermost portion thereof, said second flow passage opening into the flow passage between said reservoir and said container,
   and wherein said vent means includes a portion extending vertically above said point at which said second flow passage portion opens into said tank means.

12. Battery filling apparatus comprising, in combination,
   a battery including a liquid container,
   a liquid reservoir,
   means defining a flow passage extending from said reservoir and opening into said battery container,
   means for causing flow of liquid in said flow passage from said reservoir to said battery container,
   vent means defining an exhaust passage from the interior of said battery container to a point exteriorly of said battery container, said vent means opening into the interior of said battery container at a point corresponding to a predetermined liquid level within said container so that said exhaust passage provides air exhaust from said container so long as said liquid is below said predetermined level,
   said battery container being otherwise substantially sealed except for said vent means and flow passage,
   and liquid holding means connected to said reservoir to receive liquid flow from said reservoir after the liquid in said container reaches said predetermined level.

13. The apparatus of claim 12 wherein said means for causing flow of said liquid comprises pump means operative to pressurize the interior of said reservoir to force said liquid from said reservoir and through said flow passage to said battery container.

14. The apparatus of claim 13 including means for returning said liquid to said reservoir from said liquid holding means after said flow causing means is de-energized.

15. The apparatus of claim 14 wherein said liquid holding means comprises tank means positioned above the level of liquid in said liquid reservoir and including means defining a second passage for flow of liquid from said liquid reservoir to said tank means,
   said liquid return means includes means defining a return flow passage from said tank means to said liquid reservoir and valve means in said return flow passage,
   said liquid reservoir being substantially sealed except for said flow passage means and said tank means being at a pressure lower than the pressure in said reservoir during said second time interval.

16. The apparatus of claim 15 wherein said flow passage into said battery container opens into said battery container above the level of liquid in said reservoir.

17. The apparatus of claim 16 wherein said second flow passage includes a portion extending generally vertically in said second reservoir and opening into said tank means above the lowermost portion thereof,
and wherein said vent means includes a portion extending vertically above said point at which said second flow passage portion opens into said reservoir.

18. Battery charging and filling apparatus comprising, in combination,
a battery including a liquid container and vent means opening the interior of said battery to the battery ambient, said vent means operative selectively to open said battery interior to the ambient when the liquid in said battery is below a predetermined level and to close said battery interior to said ambient when said liquid is at said level,
a liquid reservoir,
means defining a flow passage connecting said reservoir and said battery interior,
means for causing liquid to flow from said reservoir to said battery under pressure,
said battery being substantially sealed except for said vent means and said flow passage so that said battery interior is pressurized after said vent means is closed and a pressure equilibrium condition is produced between said battery and said means causing liquid flow to terminate liquid flow to said battery,
battery charging means connected to said battery,
and means controlling energization of said means for causing liquid flow and said battery charging means.

19. Battery fill apparatus comprising, in combination,
a battery including a liquid container,
a liquid reservoir,
means defining a flow passage extending from said reservoir and opening into said battery container,
means for causing flow of liquid in said flow passage from said reservoir to said battery container,
vent means defining an exhaust passage from the interior of said battery container to a point exteriorly of said battery container, said vent means opening into the interior of said battery container at a point corresponding to a predetermined liquid level within said container so that said exhaust passage provides for exhaust from said container so long as said liquid is below said predetermined level,
said battery container being otherwise substantially sealed except for said vent means and flow passage,
and stand pipe means connected to said flow passage and extending to a predetermined vertical point above the liquid level in said reservoir.

References Cited
UNITED STATES PATENTS

| | | | |
|---|---|---|---|
| 944,079 | 12/1909 | Decker | 136—162 |
| 1,467,966 | 9/1923 | Watzman | 136—162 |
| 1,471,048 | 10/1923 | Menger | 136—162 |
| 1,967,800 | 7/1934 | Woodbridge | 136—162 |

ALLEN B. CURTIS, *Primary Examiner.*

D. L. WALTON, *Assistant Examiner.*

U.S. Cl. X.R.

136—165; 141—121, 192